United States Patent
Wang et al.

(10) Patent No.: US 11,379,710 B2
(45) Date of Patent: Jul. 5, 2022

(54) PERSONALIZED AUTOMATED MACHINE LEARNING

(71) Applicant: International Business Machines Corporation, Armonk, NY (US)

(72) Inventors: Dakuo Wang, Cambridge, MA (US);
Chuang Gan, Cambridge, MA (US);
Ming Tan, Malden, MA (US);
Arunima Chaudhary, Dehradun (IN);
Lin Ju, Markham (CA)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 16/805,019

(22) Filed: Feb. 28, 2020

(65) Prior Publication Data
US 2021/0271956 A1    Sep. 2, 2021

(51) Int. Cl.
*G06N 3/04* (2006.01)
*G06K 9/62* (2022.01)
*G06N 3/08* (2006.01)

(52) U.S. Cl.
CPC ......... *G06N 3/0454* (2013.01); *G06K 9/6215* (2013.01); *G06K 9/6231* (2013.01);
(Continued)

(58) Field of Classification Search
CPC ...... G06N 3/0454; G06N 3/0472; G06N 3/08; G06N 3/084; G06N 20/00; G06K 9/6215;
(Continued)

(56) References Cited

U.S. PATENT DOCUMENTS

| | | |
|---|---|---|
| 2015/0170053 A1 | 6/2015 | Miao |
| 2018/0336221 A1 | 11/2018 | Pena Munoz et al. |

(Continued)

FOREIGN PATENT DOCUMENTS

| | | |
|---|---|---|
| CN | 101694652 A | 4/2010 |
| CN | 103136253 A | 6/2013 |

(Continued)

OTHER PUBLICATIONS

Frias-Martinez et al., "Automated User Modeling for Personalized Digital Libraries", International Journal of Information Management, vol. 26, No. 3, pp. 234-248; 2006.
(Continued)

*Primary Examiner* — Siamak Harandi
(74) *Attorney, Agent, or Firm* — L. Jeffrey Kelly (57) ABSTRACT

In accordance with an embodiment of the invention, a method is provided for personalizing machine learning models for users of an automated machine learning system, the machine learning models being generated by an automated machine learning system. The method includes obtaining a first set of datasets for training first, second, and third neural networks, inputting the training datasets to the neural networks, tuning hyperparameters for the first, second, and third neural networks for testing and training the neural networks, inputting a second set of datasets to the trained neural networks and the third neural network generating a third output data including a relevance score for each of the users for each of the machine learning models, and displaying a list of machine learning models associated with each of the users, with each of the machine learning models showing the relevance score.

19 Claims, 5 Drawing Sheets

(52) U.S. Cl.
CPC ......... *G06K 9/6256* (2013.01); *G06N 3/0472* (2013.01); *G06N 3/08* (2013.01)

(58) Field of Classification Search
CPC .. G06K 9/6231; G06K 9/6256; G06K 9/6262; G06K 9/6271; G06K 9/6253
See application file for complete search history.

(56) References Cited

U.S. PATENT DOCUMENTS

| | | | |
|---|---|---|---|
| 2019/0102684 A1 | | 4/2019 | Beran et al. |
| 2019/0147369 A1 | * | 5/2019 | Gupta ................. G06N 3/084 706/12 |
| 2019/0370681 A1 | * | 12/2019 | Oba ..................... G06N 20/10 |

FOREIGN PATENT DOCUMENTS

| | | | |
|---|---|---|---|
| CN | 109767255 A | | 5/2019 |
| CN | 109903117 A | * | 6/2019 |
| CN | 109903117 A | | 6/2019 |
| EP | 3489838 A1 | | 5/2019 |
| WO | 2013182718 A1 | | 12/2013 |
| WO | 2021171126 A1 | | 9/2021 |

OTHER PUBLICATIONS

Disclosed Anonymously. "Customized Dynamic Application Delivery Based on User Need", IPCOM000256266D; 2018.

Dos Santos et al., "Integrating Intelligent Agents, User Models, and Automatic Content Categorization in a Virtual Environment", International Conference on Intelligent Tutoring Systems, pp. 128-139; 2004.

Ajenstat, "Augmented Analytics", Tableau Augmented Analytics, https://www.tableau.com/solutions/ai-analytics/augmented-analytics, Accessed on May 11, 2022, 8 pages.

He et al., "Amc: AutoML for model Compression and Acceleration on Mobile Devices", arXiv:1802.03494v4 [cs.CV] Jan. 16, 2019, 17 pages.

International Search Report and Written Opinion, International application No. PCT/IB2021/051137, International filing date Feb. 11, 2021, 12 pages.

* cited by examiner

PERSONALIZED AUTOMATED MACHINE LEARNING

BACKGROUND

The present invention relates generally to computing systems and methods, and, more particularly, to generating personalized machine learning models.

Machine learning is an application of artificial intelligence that provides computing systems the ability to automatically learn and improve from experience without using explicit instructions or programs. In many industries, machine learning is currently applied to solve real-world business problems by predicting patterns.

Figure 1:
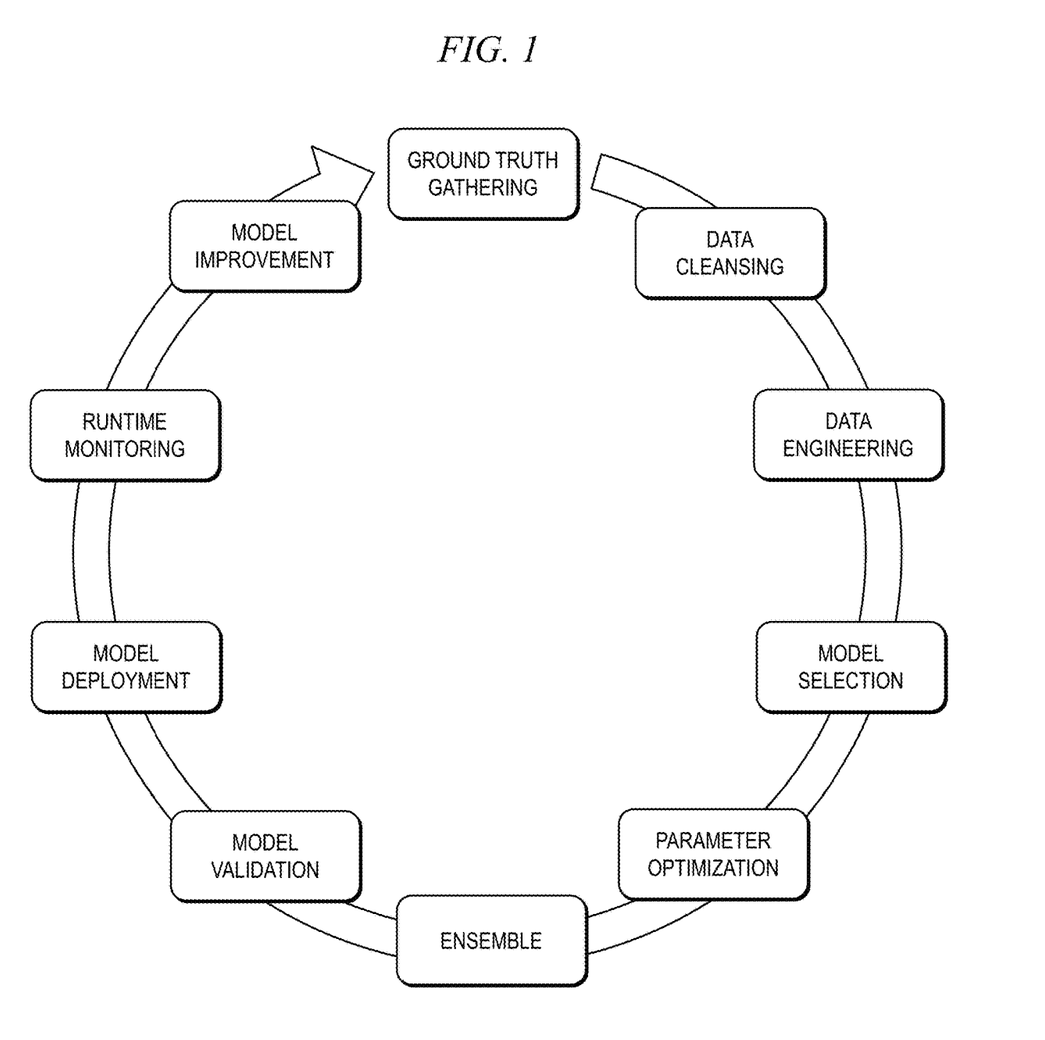
FIG. 1 is a schematic diagram conceptually depicting at least a portion of exemplary processes typically involved in a lifecycle of machine learning.

As shown in FIG. 1, various processes need to be performed during the lifecycle of applying machine learning to a real-world business problem. A first step of the machine learning lifecycle is identifying the business problem to be solved and understanding business requirements to improve operations; that is, a ground truth gathering phase.

A second step of the machine learning lifecycle is to collect all raw data related to the business requirements and prepare the data for use in applying machine learning. This step involves data cleansing and/or data engineering for use in training of machine learning models (or algorithms). Typically, data cleaning is performed to identify and remove errors in data, in order to create a clean (reliable) dataset for machine learning. This step is crucial because good data preparation and engineering produces clean and reliable data, which leads to more accurate model predictions. For example, if data is missing, the machine learning algorithm cannot use it. If data is invalid, the machine learning algorithm produces less accurate or even misleading outcomes.

A next step in the machine learning lifecycle is to select a model from a collection of candidate machine learning models for training with the prepared and cleaned dataset. Examples of suitable machine learning models include regression algorithms, instance-based algorithms, regularization algorithms, decision tree algorithms, clustering algorithms, association rule learning algorithms, artificial neural network algorithms, deep learning algorithms, dimensionality reduction algorithms, ensemble algorithms, etc.

A fourth step in the machine learning lifecycle is to improve the selected model by tuning or optimizing the hyperparameters. During this step, a set of optimal hyperparameters are selected and the selected hyperparameters determine the structure of the machine learning model. Next, during an ensemble state, if two or more models are selected, then the models are combined to produce one optimal predictive model. Once the selected model is trained and tuned, during the model validation step, the model is evaluated with the testing dataset. The model is validated until it produces a desired behavior.

After the model validation, the machine learning model is then released to the production environment during a model deployment step to start making predictions by processing unseen (or new) data. Finally, a last step in the machine learning lifecycle is to monitor (e.g., runtime monitoring) the deployed model and continue to improve its performance.

The processes involved in the machine learning lifecycle described above are manually performed by highly trained data engineers and/or data scientists. Thus, these processes are time-consuming, resource-intensive, labor-intensive, costly, and difficult to perform. To resolve these limitations with applying machine learning, automated machine learning (AutoML or AutoAI), which is the process of automating the steps typically involved in applying machine learning to real-world business problems, has been gaining a lot of attention within the technical field of machine learning.

Companies, such as International Business Machines Corporation (IBM), Google, and H2O.ai, have been investing time and resource in building and commercializing a system for automating the processes involved in the lifecycle of machine learning. These commercialized automated machine learning systems assist a user with automating the machine learning processes and automate the complete pipeline from collecting a raw dataset to deploying machine learning models. However, the automated machine learning systems currently available in the marketplace have some limitations. One limitation is that the automated machine learning systems are not capable of generating machine learning models to accommodate each individual user's preferences or different domain (industry) of use. For example, the information pertaining to certain raw data may be more important to one user who is an expert in a banking industry, whereas the raw data may be of lesser importance to another user who is an expert in an automobile industry. The automated machine learning systems simply do not consider the different preferences and domains and instead generate the same list of machine learning models for all users.

SUMMARY

The present invention, as manifested by embodiments thereof, provides a method for personalizing machine learning models for users of an automated machine learning system, the machine learning models being generated by an automated machine learning system. The method includes obtaining a first set of datasets for training first, second, and third neural networks, inputting the training datasets to the neural networks, tuning hyperparameters for the first, second, and third neural networks for testing and training the neural networks, inputting a second set of datasets to the trained neural networks and the third neural network generating a third output data including a relevance score for each of the users for each of the machine learning models, and displaying a list of machine learning models associated with each of the users, with each of the machine learning models showing the relevance score.

In accordance with another embodiment of the invention, an apparatus is provided for personalizing machine learning models for users of an automated machine learning system, the machine learning models generated by the automated machine learning system. The system includes a first neural network trained to classify the users and to produce a first output data based on the classification of the users, a second neural network trained to classify the machine learning models and produce a second output data based on the classification of the machine learning models, and a third neural network trained to predict a relevance score based on the first output data and the second output data.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present disclosure will be described herein in the context of an illustrative system and method for personalizing a list of machine learning models generated by an automated machine learning system. It is to be appreciated, however, that the specific embodiments and/or methods illustratively shown and described herein are to be considered exemplary as opposed to limiting. Moreover, it will become apparent to those skilled in the art given the teachings herein that numerous modifications can be made to the embodiments shown that are within the scope of the claims. That is, no limitations with respect to the embodiments shown and described herein are intended or should be inferred.

The subject invention involves machine learning, and more particularly, automated machine learning systems. As previously stated, machine learning is an application of the scientific study of statistical algorithms and statistical models that computer systems can learn and perform a specific task without human instructions and/or computer programs. Automated machine learning is the process of automating the steps that are typically involved in applying machine learning to a real-world business problem. Automated machine learning systems currently available in the marketplace provide useful tools (e.g., software with user interfaces) for users (e.g., data scientists, machine learning engineers, etc.) to automate the processes typically involved in applying machine learning to real-world business problems. These automated machine learning systems cover the complete lifecycle of applying machine learning from collecting raw datasets to deploying machine learning models for prediction.

Figure 2:
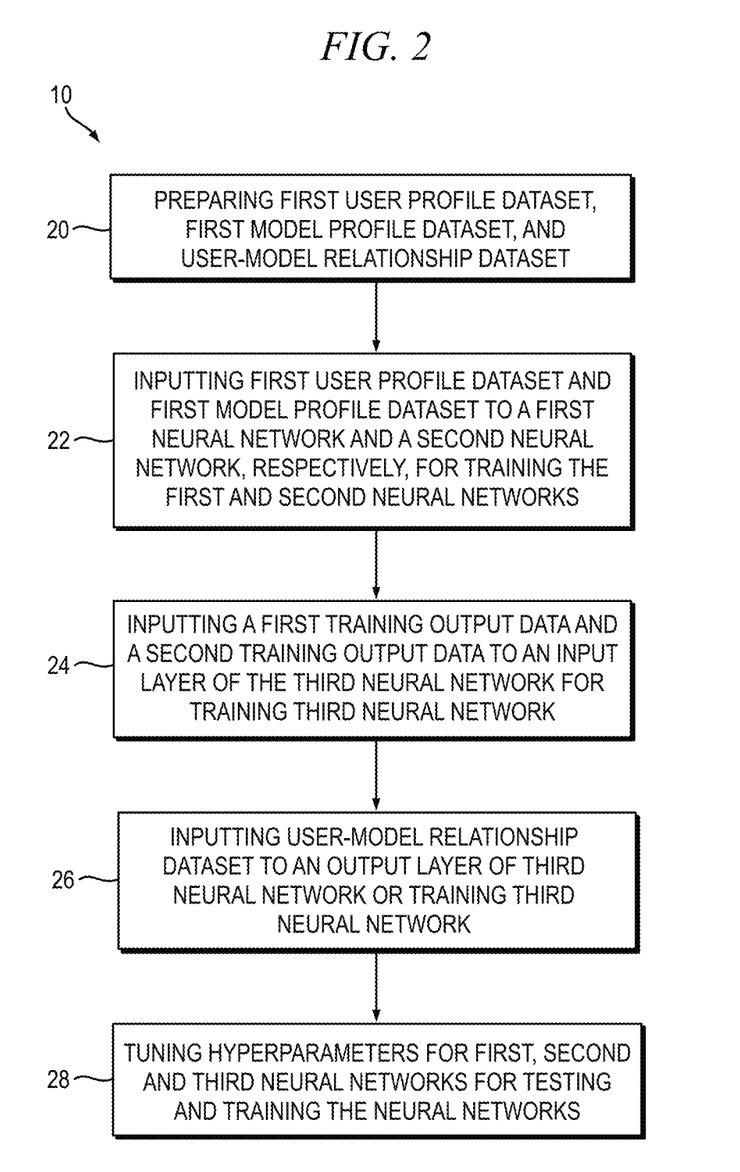
FIG. 2 is a flowchart depicting at least a portion of an exemplary method for personalizing machine learning models generated by an automated machine learning system, in a training phase, according to an embodiment of the present invention.
Figure 3:
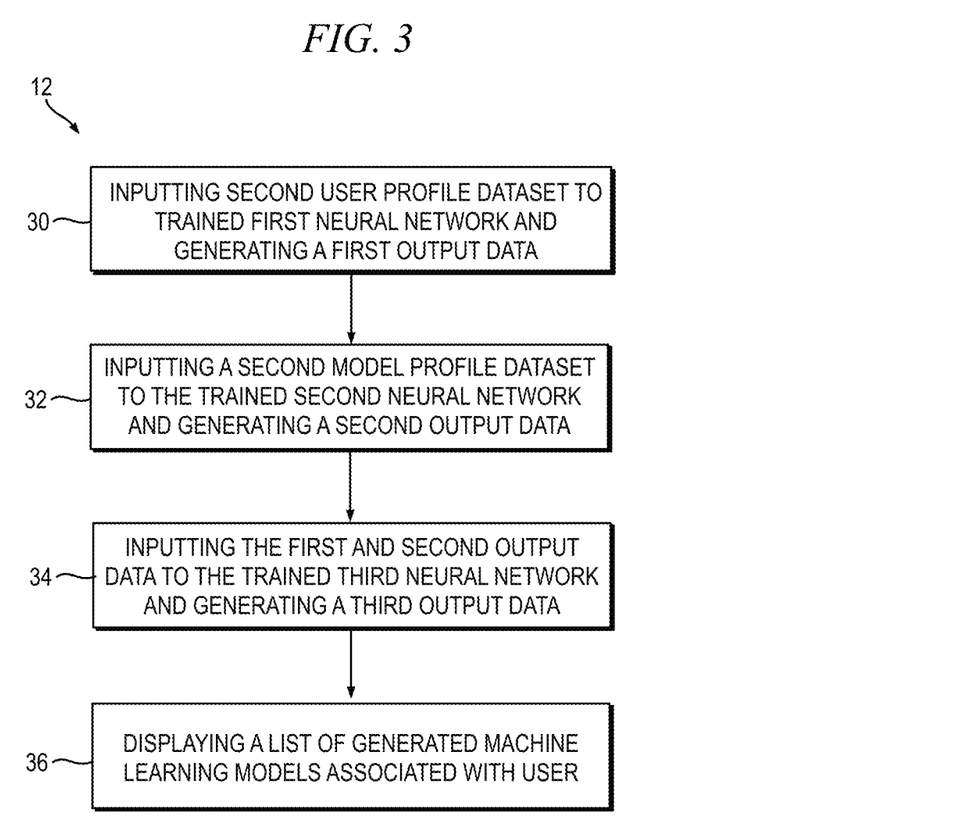
FIG. 3 is a flowchart depicting at least a portion of an exemplary method for personalizing machine learning models generated by an automated machine learning system, in a prediction phase, according to an embodiment of the present invention.
Figure 4:
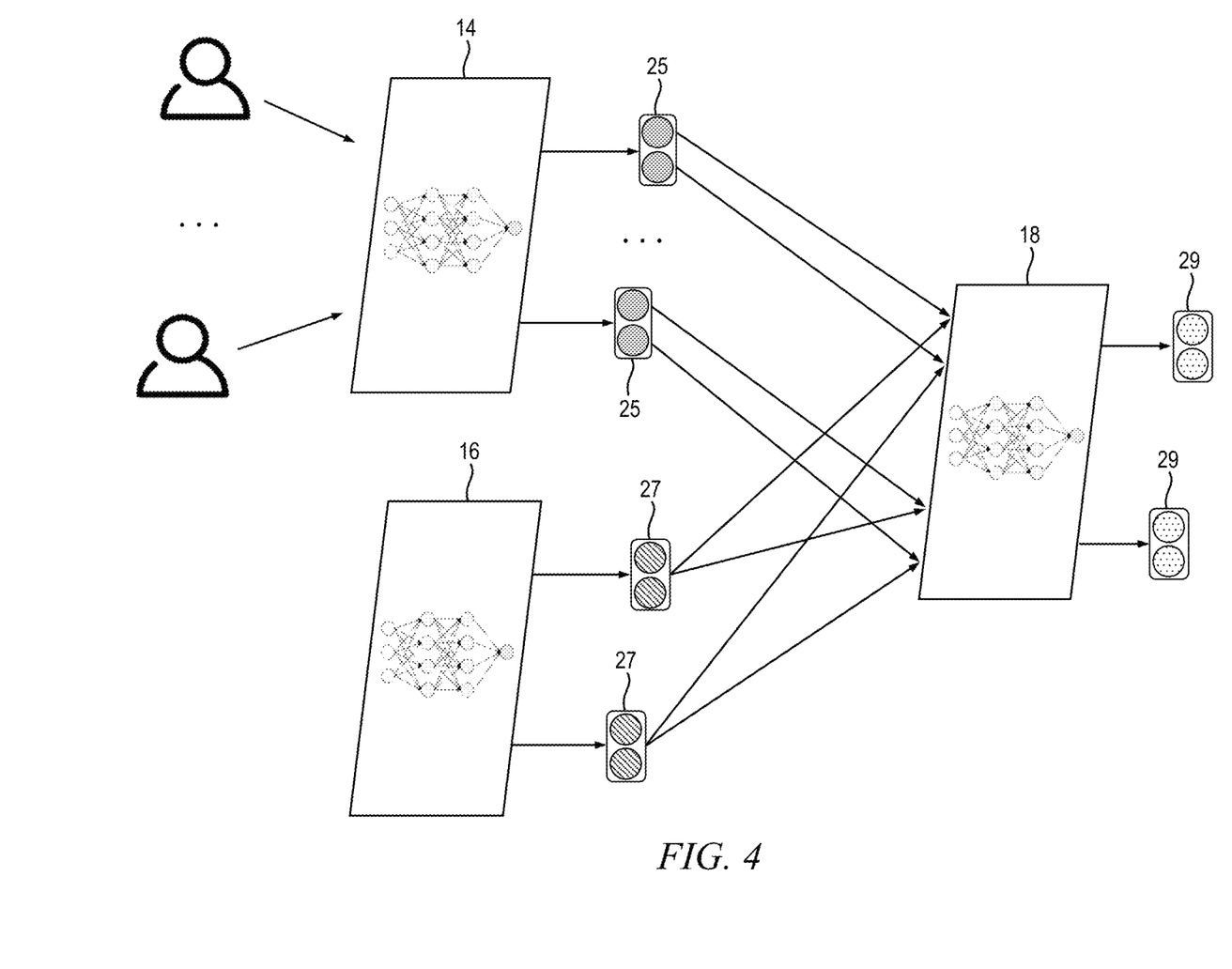
FIG. 4 is a schematic diagram conceptually depicting at least a portion of an exemplary system, according to an embodiment of the present invention.

Referring to FIGS. 2-4, a method for personalizing a list of machine learning models generated by an automated machine learning system is described, according to one or more embodiments of the present invention. The method according to embodiments of the invention includes at least two phases: a training phase 10; and a prediction phase 12. During the training phase 10, a plurality of computing systems 14, 16, 18, which may be referred herein as neural networks, each of which may comprise a neural network, are trained by processing training datasets. With reference to FIG. 4, once these neural networks 14, 16, 18 are trained against the training datasets, they are applied to predict patterns to personalize a list of machine learning models in the prediction phase 12, as will be described in greater detail below.

In a first step 20, the training datasets are prepared for training the neural networks 14, 16, 18 to be applied in the prediction phase 12. These training datasets include a user profile dataset, a model profile dataset, and a user-model relationship dataset. The user profile dataset is prepared by gathering data related to users of the automated machine learning system. As shown in Table 1 below, the user profile dataset contains attributes related to users. Non-limiting examples of the user attributes are user's business industry ("Domain") (e.g., banking, legal, etc.), years of experience in data science ("DS Level"), age ("Age"), years of experience with Python® ("Python"), a registered trademark of Python Software Foundation Corp., and years of experience with Java® ("Java"), a registered trademark of Oracle America, Inc. Additional attributes related to the users may be added to the user profile dataset as needed.

TABLE 1

| User | Domain | DS Level | Age | Python | Java | ... |
|---|---|---|---|---|---|---|
| 1 | Bank | 5 Years | 21 | 5 | 2 | ... |
| 2 | Medical | 1 Year | 32 | 2 | 2 | ... |
| ... | | | | | | |

The model profile dataset is prepared by gathering data related to all of user's machine learning models previously generated by the automated machine learning system. As shown in Table 2 below, the model profile dataset contains attributes related to the machine learning models. Non-limiting examples of the model attributes are "Pipeline," "Accuracy," "Predict Type," "Constraint," "Feature Engineering," and "Deep Learning." Additional attributes related to the models may be added to the model profile dataset as needed.

TABLE 2

| Pipeline | Accuracy | Predict Type | Constraint | Feature Engineering | Deep Learning | ... |
|---|---|---|---|---|---|---|
| 1 | 0.86 | Binary | Predict time | 0 | 1 | ... |
| 2 | 0.4 | Binary | Predict time | 1 | 0 | ... |
| ... | | | | | | |

The user-model relationship dataset is prepared by gathering historical data related to user's action performed on each of the machine learning models previously generated by the automated machine learning system. Once the automated machine learning system generates a list of models for the user, the user can take one of the four action on each of the models. The user may: 1) take no action; 2) deploy the model; 3) view details of the model; or 4) improve the model. As shown in Table 3 below, the user-model relationship dataset contains three attributes: "User," "Pipeline" (model), and "User Action" (user action performed).

TABLE 3

| Pipeline | User | User Action | ... |
|---|---|---|---|
| 1 | 1 | None | ... |
| 2 | 1 | Deploy | ... |
| 2 | 2 | Retrain | ... |
| ... | | | |

Once the training datasets are prepared, the plurality of neural networks 14, 16, 18 are trained using these prepared datasets and are applied to predict patterns in the prediction phase 12. As shown in FIG. 4, the plurality of neural networks 14, 16, 18 include a first neural network 14, a second neural network 16, and a third neural network 18. Each of the neural networks 14, 16, 18 is a feed-forward neural network configured to process one of the training datasets and to generate at least one output data. Each of the neural networks 14, 16, 18 includes a plurality of processing nodes, an input layer with a plurality of input nodes, at least one hidden layer with a plurality of hidden layer nodes, and an output layer with at least one output node. These layers are connected with neural connections. Each of the plurality of neural networks 14, 16, 18 may be configured to perform machine learning statistical algorithms that provide a continuous output in vectors for clustering and classifying each user in the user profile dataset, each model in the model profile dataset, or each user-model relationship in the user-model relationship dataset.

In a second step 22 of the training phase 10, the user profile dataset is inputted into the first neural network 14. The first neural network 14 processes data contained in the user profile dataset and is trained to accurately cluster and classify users of the automated machine learning system. The user profile dataset flows forward via the plurality of input nodes from the input layer 21 to the output layer 23 of the first neural network 14.

Then, the model profile dataset is inputted into the second neural network 16. The second neural network 16 processes data contained in the model profile dataset and is trained to accurately cluster and classify machine learning models generated by the automated machine learning system. The model profile dataset flows forward via the plurality of input nodes from the input layer 25 to the output layer 27 of the second neural network 16.

With these training datasets, the first and second neural network 14, 16 learn how to produce the output data for new input data (during the prediction phase 12) by generalizing the information it learns during the training phase 10 from the user profile and model profile datasets. Training of the plurality of neural networks 14, 16, 18 typically involve modifications to the weights and biases of the neural network, based on training machine learning algorithms (back propagation). Specifically, training of these neural networks 14, 16, 18 are performed with back propagating the error to determine weights of the nodes of the plurality of hidden layers to minimize the error in the neural networks 14, 16, 18.

Once each of the first and second neural networks 14, 16 processes its respective training dataset, the first and second neural networks 14, 16 produce a first training output data 29 in vector and a second training output data 31 in vector, respectively.

To train the third neural network 18, in a third step 24, the first training output data 29 and the second training output data 31 are provided to the input layer 33 of the third neural network 18 for processing the data 29, 31. In addition, in a fourth step 26, the user-model relationship dataset is inputted to the output layer 35 of the third neural network 18 for processing the dataset. Thus, the third neural network 18 is trained by the supervised learning in which the third neural network 18 maps an input to an output based on the user-model pairs provided in the user-model relationship dataset.

Training of the third neural network 18 occurs concurrently with the training of the first and second neural networks 14, 16; that is, the three neural networks 14, 16, 18 are trained together, after providing input to the first and second neural networks 14, 16 and output to the third neural network 18. In this manner, the neural networks 14, 16, 18 essentially create a new "super-network."

In a fifth step 28, hyperparameters of each of the first, second, and third neural networks 14, 16, 18 are tuned to achieve a desired behavior for each of the neural networks 14, 16, 18. The hyperparameters are generally fixed before the actual training phase 10 starts. In addition, the hyperparameters define higher level concepts about the neural networks 14, 16, 18 such as complexity or capacity to learn and can be decided by setting different values for each hyperparameter and choosing the values that train better. Non-limiting examples of hyperparameters include a number of iterations, learning rate, and a number of hidden layers in a neural network.

Once all of the neural networks 14, 16, 18 complete the training phase 10 and achieve a desired behavior (or patterns), the neural networks 14, 16, 18 are deployed for the prediction phase 12 of personalizing machine learning models generated by the automated machine learning system. During the prediction phase 12, the neural networks 14, 16, 18 produce (or predict) a relevance score for each user for each machine learning model generated by the automated machine learning system, as will be described in greater detail below.

Referring now to FIG. 3, in a first step 30 of the prediction phase 12, a second user profile dataset and a second model user profile dataset are inputted to the trained first neural network 14 and the trained second neural network 16, respectively. While these datasets include new data related to users and machine learning models that the neural networks 14, 16 have not processed during the training phase 10, the attributes included in the second user profile dataset and the second model user profile dataset are the same attributes included in the training datasets (e.g., first user profile dataset and first model profile dataset).

In a second step 32, the trained first neural network 14 processes and classifies each row of data in the second user profile dataset based on the learning from processing the training dataset (e.g., the first user profile dataset) and generates a first output data 29. Similarly, the trained second neural network 16 processes and classifies each row of data in the second model profile dataset based on the learning from processing the training dataset (e.g., the first model profile dataset) and generates a second output data 31.

In a third step 34, the first output data 29 and the second output data 31 are inputted into the trained third neural network 18. Then, the trained third neural network 18 processes and classifies the first and second output data 29, 31 and generates a third output data 37. The third output data 37 includes a relevance score (a numeric value) that indicates a relationship between each user in the second user profile dataset and each machine learning model generated by the automated machine learning system in the second model profile data. As for the relationship between the relevance score and a prediction model, for any given user A, the prediction model will predict whether this user A will perform an action on a generated model. As previously described, this given user A may: 1) take no action; 2) deploy the model; 3) view details of the model; or 4) improve the model.

After the third neural network 18 completes processing all relevance scores for each user-model combination, in a fourth step 36, a list of generated machine learning models associated with the user, with each model showing the relevance score for each user's action, may be presented (e.g., displayed) on a user interface (e.g., graphical user interface (GUI)) within the automated machine learning system. The user receives a recommendation list or indicator to suggest which model the user may want to act on with a particular type of action. For example, the algorithm predicts that the user may deploy the first model displayed on the list, so a "recommend-to-deploy" icon, or similar indicator, may be shown on the user interface, in one or more embodiments of the invention.

Figure 5:
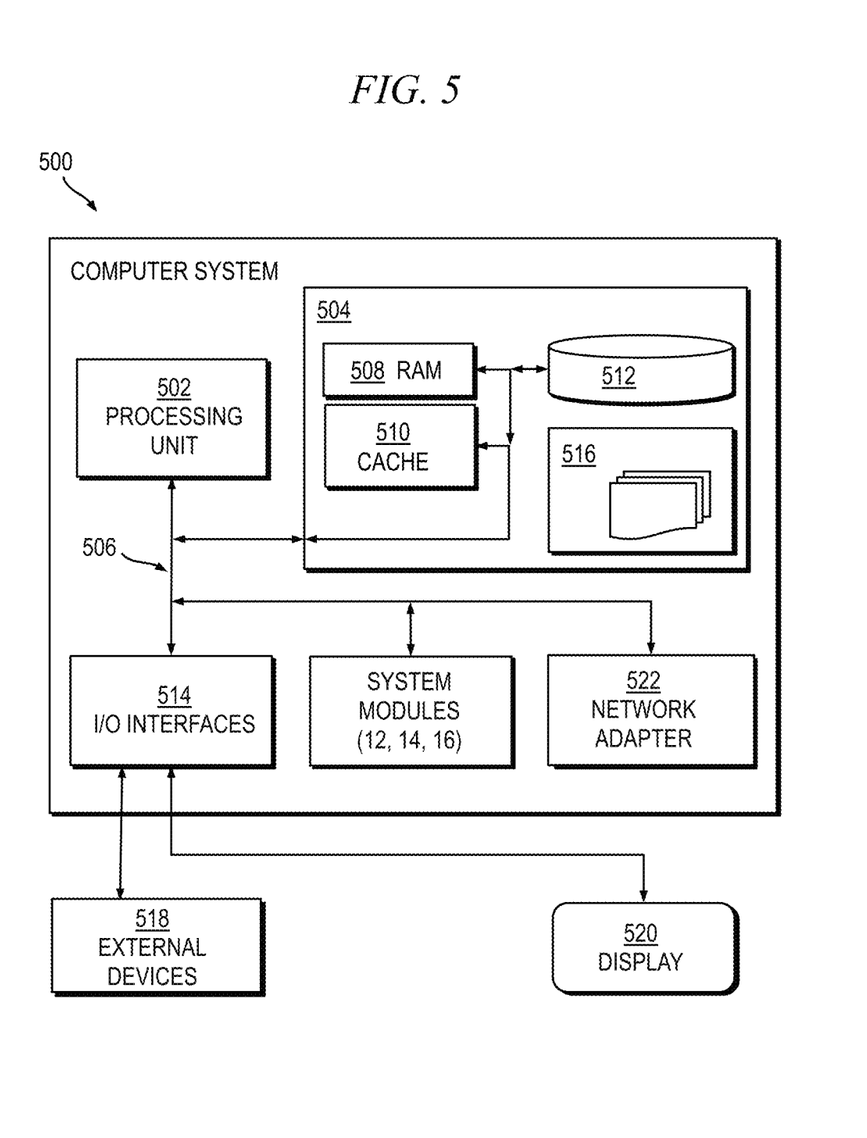
FIG. 5 is a block diagram depicting at least a portion of an exemplary computer system that may be useful in implementing one or more aspects and/or elements of the present invention.

Embodiments of the invention may be implemented together with virtually any type of computer, regardless of the platform being suitable for storing and/or executing program code. FIG. 5 shows, by way of example only and without restriction, a computing system 500 suitable for executing program code related to the proposed method, according to an embodiment of the invention.

The computing system 500 is only one example of a suitable computer system and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media including memory storage devices.

As shown in FIG. 5, computer system/server 500 is shown in the form of a general-purpose computing device. The components of computer system/server 500 may include, but are not limited to, one or more processors or processing units 502, a system memory 504, and a bus 506 that operatively couples various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a "hard drive"). Although not explicitly shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via input/output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not explicitly shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semiconductor system for a propagation medium. Examples of a computer-readable medium may include a semiconductor or solid-state memory, magnetic tape, a removable computer diskette, a random access memory (RAM), a read-only memory (ROM), a rigid magnetic disk, a flash drive, and an optical disk. Current examples of optical disks include compact disk-read only memory (CD-ROM), compact disk-read/write (CD-R/W), digital versatile disk (DVD) and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, ROM, an erasable programmable read-only memory (EPROM or flash memory), a static random access memory (SRAM), a portable CD-ROM, a DVD, a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood by those skilled in the art that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another devices to cause a series of operational steps to be performed on the computer, other programmable apparatus or other device to produce a computer implemented process, such that the instructions which execute on the computer, other programmable apparatus, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a," "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus, the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A computer-implemented method for personalizing machine learning models for at least one user of an automated machine learning system, the machine learning models being generated by the automated machine learning system, the method comprising:
    obtaining a first user profile dataset for training a first neural network, the first user profile dataset containing data related to the at least one user;
    obtaining a first model profile dataset for training a second neural network, the first model profile dataset containing one or more attributes related to the machine learning models;
    obtaining a user-model relationship dataset for training a third neural network;
    inputting, for training the first neural network, the first user profile dataset to the first neural network, the first neural network generating a first training output data;
    inputting, for training the second neural network, the first model profile dataset to the second neural network, the second neural network generating a second training output data;
    inputting, for training the third neural network, the first training output data and the second training output data to an input layer of the third neural network;
    inputting, for training the third neural network, the user-model relationship dataset to an output layer of the third neural network;
    tuning hyperparameters for the first, second, and third neural networks for testing and training the neural networks;
    once the first, second and third neural networks are trained, inputting a second user profile dataset to the trained first neural network, the trained first neural network generating a first output data;
    inputting a second model profile dataset to the trained second neural network, the trained second neural network generating a second output data;
    inputting the first output data and the second output data to the trained third neural network, the trained third neural network generating a third output data, the third output data including a relevance score for each of the users for each of the machine learning models; and
    displaying a list of machine learning models associated with the at least one user, with each of the machine learning models showing the relevance score.

2. The method of claim 1, wherein the first user profile dataset, the first user profile dataset, and the user-model relationship dataset are training datasets used during a training phase.

3. The method of claim 1, wherein the second user profile dataset and the second model profile dataset are datasets used during a prediction phase.

4. The method of claim 1, wherein the second user profile dataset includes data that is not included in the first user profile dataset.

5. The method of claim 1, wherein the second model profile dataset includes data that is not included in the first model profile dataset.

6. The method of claim 1, wherein the user's action taken on each of the machine learning models includes "no action taken", "deployed model", "improve model" and "view details of model".

7. The method of claim 1, wherein the hyperparameters comprise at least one of a number of iterations, a learning rate and a number of hidden layers in a neural network.

8. The method of claim 1, wherein the relevance score is a numeric value that represents a relationship between each of a plurality of users of the automated machine learning system and each of the machine learning models generated by the automated machine learning system.

9. The method of claim 1, wherein each of the machine learning models comprises at least one statistical algorithm.

10. The method of claim 1, wherein obtaining the user-model relationship dataset comprises gathering historical data related to each of the user's actions performed on each of the machine learning models previously generated by the automated machine learning system.

11. The method of claim 1, wherein obtaining the first model profile dataset comprises gathering data related to all of the user's machine learning models previously generated by the automated machine learning system.

12. The method of claim 1, wherein tuning the hyperparameters comprises optimizing the hyperparameters of each of the first, second, and third neural networks to achieve a desired behavior for each of the neural networks.

13. The method of claim 12, further comprising setting different values for each of the hyperparameters, the different values defining higher level concepts relating to the first, second and third neural networks, wherein optimizing the hyperparameters is as a function of the different values set for each of the hyperparameters.

14. The method of claim 13, wherein the higher level concepts relating to the first, second and third neural networks comprise at least one of complexity and capacity to learn.

15. A system for personalizing machine learning models for one or more users of an automated machine learning system, the machine learning models generated by the automated machine learning system, the system comprising:
    memory; and
    at least one processor coupled to the memory, the at least one processor be configured to implement:
        a first neural network, the first neural network trained to classify the users and to produce a first output data based on the classification of the users;
        a second neural network, the second neural network trained to classify the machine learning models and produce a second output data based on the classification of the machine learning models; and
        a third neural network, the neural network trained to predict a relevance score based on the first output data and the second output data.

16. The system of claim 15, wherein the relevance score is a numeric value that provides a relationship between each of the users and each of the machine learning models generated by the automated machine learning system.

17. The system of claim 15, wherein each of the first, second, and third neural networks includes a plurality of processing nodes, an input layer with a plurality of input nodes, at least one hidden layer with a plurality of hidden layer nodes, and an output layer with at least one output node.

18. The system of claim 15, wherein each of the machine learning models comprises at least one statistical algorithm.

19. A method of providing a personalized artificial intelligence model for at least one user of an automated machine learning system, the method comprising:
    receiving, by a computing device, a dataset for analysis;
    retrieving, by the computing device, a user history for the at least one user, the user history indicating a historical selection of one or more artificial intelligence models;
    generating, by the computing device, a personalized list of machine learning models for the dataset based at least in part on the historical selection of the one or more artificial intelligence models; and
    presenting, by the computing device, the personalized list of machine learning models via a user interface.

* * * * *